Sept. 22, 1970  F. F. POLIZZANO ET AL  3,529,340
APPARATUS FOR MAKING METALLIC SHEATHED CABLES WITH
FOAM CELLULAR POLYOLEFIN INSULATION
Filed Aug. 13, 1968
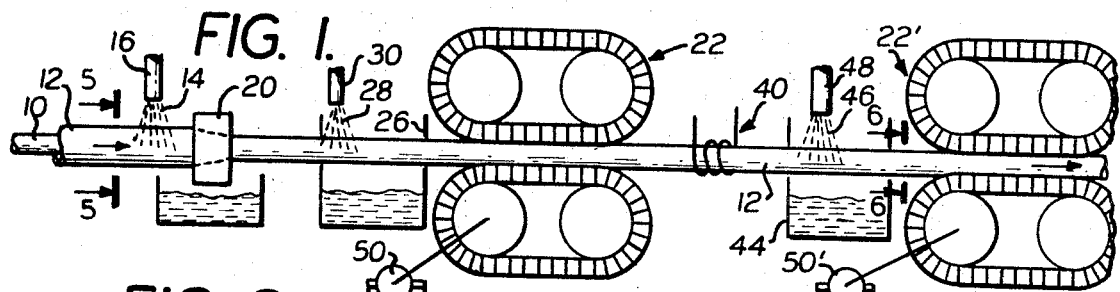
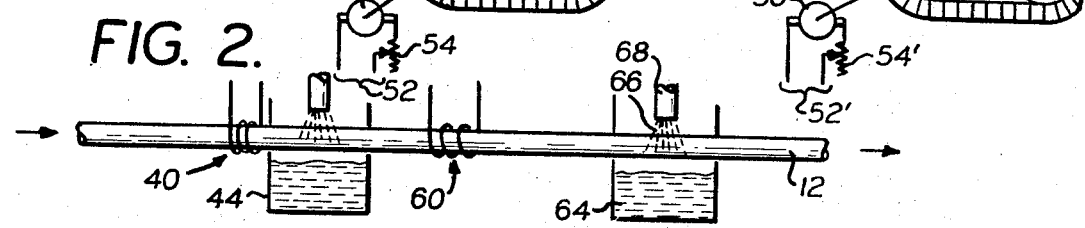
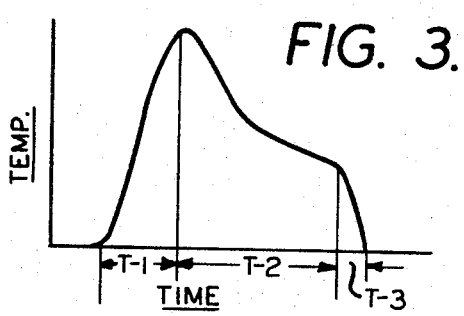
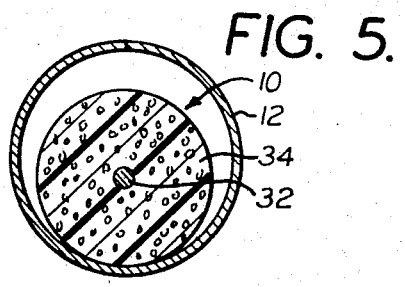
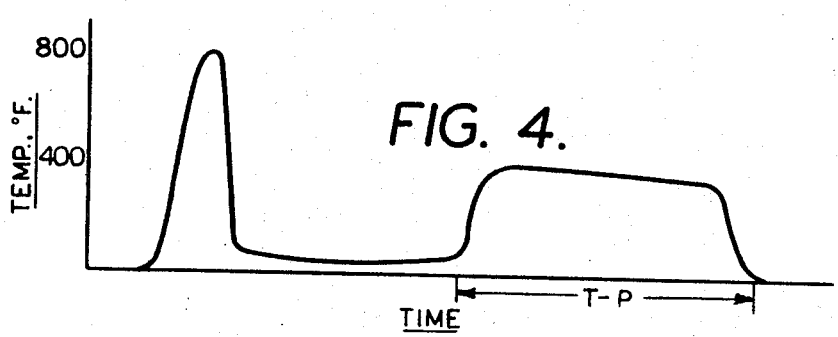
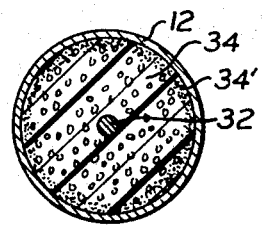
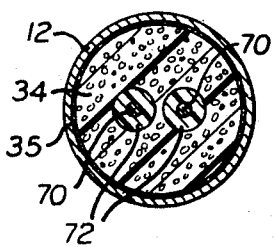
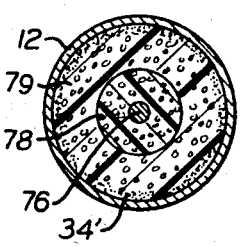
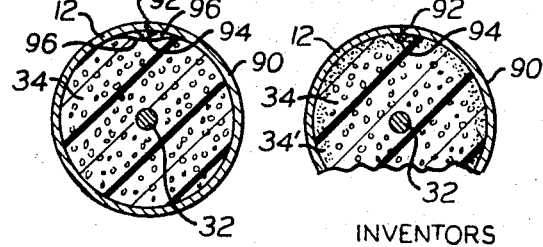
INVENTORS
Sandoe, Neill,
BY Schottler, Wihstrom
ATTORNEYS.

United States Patent Office 3,529,340
Patented Sept. 22, 1970

3,529,340
APPARATUS FOR MAKING METALLIC SHEATHED CABLES WITH FOAM CELLULAR POLYOLEFIN INSULATION
Fred F. Polizzano, Allendale, and William J. Brorein, Whippany, N.J., assignors to General Cable Corporation, New York, N.Y., a corporation of New Jersey
Filed Aug. 13, 1968, Ser. No. 752,211
Int. Cl. H05k 13/00; B23p 19/00
U.S. Cl. 29—202.5    13 Claims

ABSTRACT OF THE DISCLOSURE

This specification discloses apparatus for making metallic sheathed cables with foam cellular polyolefin insulation by sinking a sheath down into contact with a foam insulated core to which the sheath is applied and then fustion bonding the foam to the sheath by heating the sheath after the sinking operation. The sheath is annealed to improve the flexibility of the cable; and the electrical characteristics of the insulation are improved by flowing the insulation into irregularities of the inner surface of the sheath. This flow is produced by having the insulation under the same compression which causes equalization of the pressure around the circumference of the cable when the insulation is heated to a flowable temperature.

RELATED PATENT APPLICATIONS AND BACKGROUND OF THE INVENTION

A new method of making sheathed cables with foam insulation and using heating of the sheath and foam after sinking of the sheath over the foam insulated core is described and claimed in our patent application Ser. No. 733,528, filed May 31, 1968. That application also contains claims to the cable produced by the method. Novel apparatus is required for carrying out certain features of the method of that application, and the present application claims this novel apparatus.

It is necessary to make electrical cable in long lengths, and for purposes of economy and manufacture it is desirable to perform as many of the manufacturing steps as possible in a continuous operation. In order to sink the sheath and to heat it to annealing temperature in a continuous operation, within a short run of the cable, and to insure against stretching of the sheath while hot, the purpose of this invention separates the usual pulling force, which is applied to the sheath, between different stations along the length of the cable. The major puller is located ahead of the heating station, that is, upstream in the direction in which the cable is travelling; and a puller of substantially less force is positioned beyond the annealing station. The pulling forces are coordinated with one another.

Although the insulation can be fused to the sheath and the sheath annealed at the same time, a modification of this invention includes different heating stations spaced along the length of the cable and correlated with one another so that when the cable passes both heating stations at the same speed (as is necessary for the continuous operation), the sheath is raised to optimum annealing conditions of time and temperature at one station, and the sheath is heated to optimum conditions for adhesion to the insulation at the other station.

Other objects, features and advantages of the invention will appear or be pointed out as the description proceeds.

BRIEF DESCRIPTION OF THE DRAWING

In the drawing, forming a part hereof, in which like reference characters indicate corresponding parts in all the views;

FIG. 1 is a diagrammatic view of the apparatus of this invention for making electrical cable;
FIG. 2 is a fragmentary diagrammatic view showing a modification of part of the apparatus shown in FIG. 1;
FIG. 3 is a diagram illustrating the heating and cooling of the cable when using the apparatus shown in FIG. 1;
FIG. 4 is a diagram showing the heating and cooling of the cable when using the apparatus shown in FIG. 2;
FIG. 5 is a greatly enlarged sectional view through the cable on the section line 5—5 of FIG. 1;
FIG. 6 is a view corresponding to FIG. 5 but taken on the section line 6—6 of FIG. 1;
FIG. 7 is a view similar to FIG. 6 but showing a modified form of cable;
FIG. 8 is a view similar to FIG. 6 but showing another modification in which more than one layer of foam insulation is used;
FIG. 9 is a sectional view illustrating the way in which void areas may exist within the sheath after sinking of the sheath; and
FIG. 10 is a view similar to FIG. 9 after the voids have been filled in accordance with the method of this invention.

DESCRIPTION OF PREFERRED EMBODIMENTS

With the apparatus of this invention, an insulated core 10 is first placed in a metal sheath 12. This can be done in a number of ways well understood in the art. Whether the sheath is formed around the insulated core by folding a strip or tape longitudinally and welding it, or whether the insulated core is drawn into a seamless tube, the insulated core is always of smaller diameter than the inside diameter of the sheath 12.

The sheath 12 is lubricated by lubricant 14 discharged over the outside of the sheath 12 from a supply nozzle 16. The sheath is pulled through a sinking die 20 by a caterpillar capstan 22. In place of the sinking die 20, reducing rolls can be used, if desired. Beyond the sinking die 20 the cable sheath passes through a cleaning chamber 26 in which celaning fluid 28 is discharged against the surface of the sheath from a nozzle 30 to remove the lubricant.

FIG. 5 shows the cable before passage through the sinking die 20. The cable illustrated consists of a center conductor or core 32 surrounded by foamed plastic insulation 34, and the core 32 insulated by the foamed plastic 34 is loose in the sheath 12. The core 32 can have a plurality of conductors and these conductors can be covered with their own individual insulation.

After passage through the sinking die 20 the diameter of the sheath 12 is reduced so that it fits snugly around the foamed plastic insulation 34. It is desirable to have the die 20 of a size to put the foamed plastic insulation under some compression, the purpose of which will be explained in connection with other figures.

Beyond the caterpillar capstan 22 the sheath 12 passes through an induction heater 40 which raises the temperature of the sheath high enough to bond the foamed plastic to the inside surface of the sheath. This can be done by melting the surface of the foamed plastic which is in contact with the sheath. The heat should not be excessive because melting of the foam to an excessive depth will reduce the volume of the foam so that it no longer fills the inside of the sheath 12. The permissible amount of melting depends upon how much the foam is compressed by the sheath. The reason that some compression is desirable is that it causes the foam, when heated to a softening temperature and flowable condition, to flow as necessary to touch all portions of the inside surface of the sheath 12.

If the sheath is not completely round, then the softened foam will accommodate itself to any lack of circularity. Where the inside surface of the sheath is not completely smooth, the softened foam, when under some compression, flows into the irregularities so as to have contact with the entire inside surface of the sheath. This results in a better bond and is also useful in obtaining hermetic sealing between the foamed plastic insulation and the inside surface of the sheath 12.

Another type of irregularity results from variations in the inside diameter of the sheath. These may be periodic and originate by minor eccentricity of the rolls by which the sheath is made. Such irregularities cause variations in the compression of the insulation in the sheath at axially spaced locations and this can result in the setting up of standing waves when the cable is used to conduct high frequency electricity. This invention eliminates this cable problem because the foamed plastic, when softened, adjusts to any irregularities in inside diameter of the sheath and produces a substantially uniform pressure on the insulation with resulting improvements in the electrical characteristics of the insulation.

Although the maximum permissible melting of the foamed insulation depends upon the compression, it is preferable to have the depth of melting less than 10% of the radial thickness of the foam, and in any event, less than 20%.

The plastic used for the foamed insulation of this invention is preferably a polyolefin such as polyethylene having a percentage of air of about 45% to 55%. These values are given by way of illustration. Polypropylene can also be used.

Commercially available foamed polyethylene material, such as Union Carbide's DFA 4860, DFD 4960 and others, will bond, with no extra adhesive materials, to clean copper, aluminum or steel, if the temperature of the sheath is raised quickly to about 300° F. to 850° F. for up to 10 seconds and is then quickly quenched or cooled to control the depth of melt. These are not limiting conditions but are typical of usual processing speeds. For example, small cables with aluminum sheaths can be successfully bonded when heated to 600° F. for only 2 or 3 seconds while larger cables require longer periods of time to insure the desired depth of melt which is usually held to about 0.001 inch up to 0.020 inch, depending on the size of cable, but these limits do not cover all sizes and types with which the invention can be used.

The foamed insulation can be bonded to the inside of the sheath at lower temperature if an adhesion-promoting material is used. When the sheath is formed around the insulated core, such adhesion-promoting material can be applied to the surface of the sheath which will constitute the inside of the sheath after forming, or it can be applied to the outside surface of the foamed insulation. When the insulated core is pulled into an already formed seamless sheath, it is impractical to coat the inside of the sheath and the adhesion-promoting material is applied to the outside of the insulated core before pulling the core into the seamless tubing.

The advantage of using adhesion-promoting material is that some types melt and form a bond at a lower temperature than that of the foamed insulation. Examples of suitable adhesion-promoting materials are the amorphous polypropylene family as made by Avisun Corporation, such as Oletac TD–133 and these may be used for special designs where it is not desirable to heat the sheath over about 300° F. to 400° F. Polyolefin and acrylic acid copolymers may also be used to promote adhesion. This type is known also as polyolefin copolymers containing carboxyl groups and is useful in maintaining a bond under severe environmental conditions.

Close beyond the heater 40 the sheath 12 passes through a quenching chamber 44 in which water or other cooling fluid 46 is discharged against the sheath 12 from one or more nozzles 48. This quenching provides a control on the depth of melting. The period of time between the heating and quenching depends upon the axial spacing of the quenching chamber 44 from the heater 40 and upon the speed of travel of the cable. The depth of melt can be controlled by changing the amount of heating or the speed of travel of the cable or the spacing of the quenching chamber from the heater. Means for changing the speed and/or power of the capstan 22 are shown diagrammatically in FIG. 1 as a motor 50 which drives the capstan 22, the motor being supplied with power from a power line 52 through a controller 54.

Beyond the quenching chamber 44, the cable sheath is advanced by another capstan 22' having driving means similar to the capstan 22 and indicated by the same reference characters with a prime appended.

The reason for the use of two capstans 22 and 22' is to avoid excessive pull on the cable sheath while it is heated by the heater 40. Considerable pull is necessary to advance the cable sheath through the sinking die 20, or reducing rollers if non-powered rollers are used, and the tension imparted to the sheath by this pull is more than the tube can withstand without stretching when highly heated.

If the speed of both of the motors 50 and 50' is increased at the same time, the speed of travel of the cable through the apparatus is increased. The controllers 54 and 54' are adjustable independently of one another and this is an important feature. The controller 54 is adjusted to make the capstan 22 supply all, or at least most, of the power necessary to pull the cable sheath 12 through the sinking die 20. The controller 54 is adjusted to keep the power of the motor 50' and the pull of the capstan 22' less than the pull necessary to stretch the sheath 12 while the sheath is hot and passing from heater 40 through quenching chamber 44.

Although it is more economical to assemble the insulated core and sheath in a continuous operation with the sinking of the sheath and the heating and quenching operations of this invention, it is not essential that these operations be combined. Foam-insulated cable with the sheath fitting snugly around the insulated core can be supplied from reels on which it has been stored and can be treated by the heating and quenching of this invention; and in such cases it is not necessary to use two caterpillar capstans, since the cable is subject to very little tension when merely unwound from a reel.

In addition to the bonding of the foamed insulation to the sheath and the equalizing of the pressures in the insulation, the heating of the sheath by the heater 40 serves another important purpose. In the use of aluminum and copper sheaths, the metal is work-hardened by the sinking operation which reduces the diameter of the sheath to fit snugly around the insulated core. This hardening makes the cable stiff. The heating of the sheath in accordance with this invention anneals the sheath and substantially increases the flexibility of the cable.

Although the single heating and quenching step illustrated in FIG. 1 can be used to effect both the fusion bond and a degree of annealing of the sheath, better results are obtained with a two-stage heating and quenching, such as illustrated in FIG. 2.

The apparatus shown in FIG. 2 includes the heater 40 and the quenching chamber 44; and also includes a second heater 60 with a quenching chamber 64 located beyond the quenching chamber 44 in the direction in which the cable sheath 12 travels. In the quenching chamber 64 the sheath is quenched by water 66 or other cooling fluid discharged against it from a nozzle 68 in the same manner as already described for the quenching chamber 44. Elements 40 and 44 are closer than in FIG. 1. The heaters 40 and 60 can have their heat output regulated by conventional control means.

FIGS. 3 and 4 illustrate the difference in the operation of the invention when using the single heating and the two-stage heating of FIGS. 1 and 2, respectively. FIG.

3 shows the sheath heated rapidly to a temperature of approximately 600° F. to 750° F. in a period of time T-1. As the sheath passes beyond the heater, it cools during a dwell time T-2 as it passes from the heater to the quenching chamber. The sheath is then cooled quickly during a period of time T-3 to ambient temperature. This heating is not ideal for either annealing the sheath or fusing the foamed insulation, but is a practical and effective compromise if both the annealing and fusing are to be performed in the same operation.

FIG. 4 shows the two-stage heating and quenching of FIG. 2. The sheath is heated rapidly to a higher temperature than in FIG. 3, for example, approximately 700° to 800° F. and is immediately cooled so as to prevent excessive melting of the foamed insulation. As the cable travels to the next heating step, any plastic which softened or melted during the annealing heating has an opportunity to cool.

The sheath is then reheated to a temperature sufficient to cause the foamed insulation to bond to the sheath and the heating period T-P is long enough to produce the desired depth of softening necessary for equalizing pressures and producing flow into any irregularities. The heating during this period T-P is kept at a low enough temperature so that the foam obtains the desired temperature gradients. A temperature of 400° to 600° F. is shown in FIG. 4 as illustrative. The temperature used for this second heating period may be higher or lower, depending upon whether adhesion-promoting material is used, as previously described, and depending upon the softening point of the particular foam used.

FIG. 6 shows the final cable with the outer sheath 12 of annealed metal fused to a bonded outer layer of the foamed insulation 34, this outer layer being designated by the reference character 34'.

When an adhesion-promoting material is used on the inside of the sheath 12 or on the outside of the insulation 34, it forms a layer 35 as shown in FIG. 7.

FIG. 7 shows a cable which is similar to FIG. 6 except that the core contains two conductors 70 each of which is covered with a layer of insulation 72 which may be of any desired type. These conductors 70, with their insulation 72, are a twisted pair and for purposes of this invention are considered a core surrounded by foamed insulation 34 which serves the purpose of the conventional belting layer.

FIG. 8 shows a modified form of the cable of this invention. In this modification the core consists of a conductor 76 and the foamed insulation between this conductor core 76 and the sheath 12 is applied in two layers instead of the single layer shown in FIG. 6. These two layers include an inner layer 78 of foamed insulation and an outer layer 79 which is also foamed insulation. In practice, these two layers 78 and 79 may be extruded successively or simultaneously and the outer layer 79 is a softer or less dense foam than the inner layer 78. The softer layer 79 has the advantage of accommodating itself more easily to irregularities in the sheath 12.

FIGS. 9 and 10 show an example of one type of irregularity with which this invention is particularly useful. In FIG. 9 a sheath 90 has a seam 92 which is welded with a flash or bead 94 which holds the insulation 34 spaced from the inside surface of the sheath 90 on both sides of the flash or bead 94 so as to leave void areas 96 on each side of the flash or bead 94. This would leave a substantial area of the insulation unbonded to the sheath if the insulation did not flow to fill up the voids 96.

FIG. 10 shows the way in which the insulation 34 flows in and fills up the voids on both sides of the flash or bead 94 when the insulation 34, which is under some compression, is heated to its softening point.

The preferred embodiments of the invention have been illustrated and described, but changes and modifications can be made and some features can be used in different combinations without departing from the invention as defined in the claims.

What is claimed is:

1. Apparatus for making metallic sheathed electrical cables with foam cellular insulation, including means for advancing axially an electric cable having a foam insulated core and maintaining at least a part of the foam under some compression, a heater station including a heater that raises the sheath to a temperature above the softening and flow temperature of the foam, the heater being correlated with the speed of the means for advancing the cable so as to soften the foam and to distribute the pressure between the foam and sheath more uniformly around the circumference of the cable.

2. The apparatus described in claim 1 characterized by the heater having a heating capacity sufficient to fuse the foam which is in contact with the inside surface of the sheath to bond the insulation to the sheath.

3. The apparatus described in claim 2 characterized by quenching means close behind the heating station in position to cool the insulation before it melts to a reduced volume that no longer fills the cross section of the metallic sheath.

4. The apparatus described in claim 1 characterized by the heater having a heating capacity sufficient to raise the metal of the sheath to its annealing temperature during the time of passage of the cable through the heating station.

5. The apparatus described in claim 4 characterized by the apparatus being for cable with a sheath being from the group consisting of aluminum and copper, and the heater having a heat capacity sufficient to raise the aluminum of the sheath above about 800° F.

6. The apparatus described in claim 4 characterized by a quenching station beyond the heating station with means for cooling the sheath and insulation below the fusion temperature of the foam, the quenching station being spaced downstream from the heating station by a distance which is correlated with the cable speed to maintain the temperature of the sheath above the softening and flow temperature of the foam long enough for the foam to compensate for irregularities in the cross section of the sheath but short enough to prevent shrinking of the foam to a volume less than the cross section enclosed by the sheath.

7. The apparatus describeed in claim 1 characterized by two heating stations along the course of travel of the cable, a heater at the first heating station with sufficient heating capacity to heat the metal of the sheath to the annealing temperature of the metal, a heater at the second heating station with sufficient heating capacity to heat the insulation of the sheath to a temperature substantially lower than that of the first heating sation but higher than the softening and flow temperature of the foam.

8. The apparatus described in claim 7 characterized by the first quenching station being close to the first heating station whereby the metal of the sheath is immediately cooled, after reaching annealing temperature, to a temperature less than the melting temperature of the foam, and a second quenching station beyond the second heating station by a distance greater than the spacing of the first quenching station beyond the first heating station and wherein the foam is again cooled below its melting temperature.

9. The apparatus described in claim 8 characterized by the heater at the first heating station having a heating capacity that quickly heats the sheath to about 700°–800° F., and the second heating station having a heater with a heating capacity that heats the sheath and foam to a temperature of about 400°–600° F.

10. The apparatus described in claim 1 characterized by means for sinking an oversize sheath drawn into snug contact with the foam insulated core, apparatus for pulling the sheath through the sinking means, the heating station being located beyond the apparatus for pulling the sheath through the sinking means whereby the pull on the sheath is exerted before the sheath is heated at the heating station.

11. The apparatus described in claim 10 characterized by other apparatus for pulling the sheath through the heating station, power-operated mechanism for operating both of the apparatus for pulling the sheath, said power-operated mechanism exerting most of its power on the first apparatus for pulling the sheath.

12. The apparatus described in claim 11 characterized by the means for sinking the sheath being a die, and the apparatus for pulling the sheath including two caterpillar capstans, the first of which capstans is located between the sinking die and the heating station, and the second of which capstans being located beyond the heating station in the direction of travel of the cable, a separate motor for each of the capstans, and an independently operable controller for regulating the power supply of each motor, the controller for the motor for the first capstan being adjusted to make the first capstan exert a pull on the sheath substantially greater than that of the second capstan, and the controller for the motor of the second capstan being adjusted to make the second capstan exert a pull on the sheath less than the tensile strength of the heated sheath.

13. The apparatus described in claim 11 characterized by two heating stations between the two apparatus for pulling the sheath, a heater at the first heating station with sufficient heating capacity to heat metal of the sheath to the annealing temperature of the metal, a heater at the second heating station with sufficient heating capacity to heat the insulation substantially lower than that of the first heating station but higher than the softening and flow temperature of the foam.

References Cited

UNITED STATES PATENTS 3,430,330   3/1969   Garner _____ 29—202.5

THOMAS H. EAGER, Primary Examiner

U.S. Cl. X.R.

29—203, 234

UNITED STATES PATENT OFFICE
CERTIFICATE OF CORRECTION

Patent No. 3,529,340 September 22, 1970
Fred F. Polizzano et al.

It is certified that error appears in the above identified patent and that said Letters Patent are hereby corrected as shown below:

Column 1, line 18, "fustion" should read -- fusion --.
Column 6, line 46, "describeed" should read -- described --; line 53, "sation" should read -- station --.

Signed and sealed this 16th day of February 1971.

(SEAL)
Attest:

Edward M. Fletcher, Jr.
Attesting Officer

WILLIAM E. SCHUYLER, JR.
Commissioner of Patents